(12) United States Patent
Slattegard et al.

(10) Patent No.: US 11,905,342 B2
(45) Date of Patent: Feb. 20, 2024

(54) NCC FILMS AND PRODUCTS BASED THEREON

(71) Applicant: MELODEA LTD., Rehovot (IL)

(72) Inventors: Rikard Slattegard, Nes Ziona (IL); Sigal Roth Shalev, Ramot Meir (IL); Clarite Azerraf, Ashdod (IL); Yuval Nevo, Rehovot (IL)

(73) Assignee: MELODEA LTD., Rehovot (IL)

( * ) Notice: Subject to any disclaimer, the term of this patent is extended or adjusted under 35 U.S.C. 154(b) by 514 days.

(21) Appl. No.: 17/240,411

(22) Filed: Apr. 26, 2021

(65) Prior Publication Data

US 2021/0253742 A1 Aug. 19, 2021

Related U.S. Application Data

(63) Continuation-in-part of application No. 15/760,866, filed as application No. PCT/IL2016/051024 on Sep. 15, 2016, now Pat. No. 11,021,546.

(60) Provisional application No. 62/277,082, filed on Jan. 11, 2016, provisional application No. 62/244,243, filed on Oct. 21, 2015, provisional application No. 62/219,816, filed on Sep. 17, 2015.

(51) Int. Cl.
C08B 3/06 (2006.01)
C08B 3/16 (2006.01)
C08B 3/10 (2006.01)

(52) U.S. Cl.
CPC ............ C08B 3/06 (2013.01); C08B 3/10 (2013.01); C08B 3/16 (2013.01)

(58) Field of Classification Search
None
See application file for complete search history.

(56) References Cited

U.S. PATENT DOCUMENTS

| | | | | |
|---|---|---|---|---|
| 1,683,347 | A | * | 9/1928 | Gray ............... C08B 3/06 536/72 |
| 5,608,050 | A | * | 3/1997 | Kuo ................ C08B 3/06 536/69 |
| 2011/0283918 | A1 | | 11/2011 | Farris et al. |
| 2014/0065406 | A1 | | 3/2014 | Berglund et al. |
| 2015/0017432 | A1 | | 1/2015 | Shoseyov et al. |
| 2015/0376298 | A1 | | 12/2015 | Nakatsubo et al. |

FOREIGN PATENT DOCUMENTS

| | | | | |
|---|---|---|---|---|
| CN | 1583796 | A * | 2/2005 | ....... C08B 3/06 |
| CN | 1282659 | C | 11/2006 | |
| CN | 102660050 | A * | 9/2012 | ....... C08B 3/06 |
| CN | 102660050 | A | 9/2012 | |
| JP | 58-93701 | A | 6/1983 | |
| JP | 6-157601 | A | 6/1994 | |
| JP | H10/1045804 | A * | 2/1998 | ....... B01J 27/02 |

(Continued)

OTHER PUBLICATIONS

Kiyose—JP H10-45804 A—MT—mixed fatty acid ester of cellulose—1998 (Year: 1998).*

(Continued)

*Primary Examiner* — John Vincent Lawler
(74) *Attorney, Agent, or Firm* — Vorys, Sater Seymour and Pease LLP; Anthony P. Venturino

(57) ABSTRACT

Provided are NCC-based materials, as superb barrier materials for preventing oxygen and humidity from penetrating therethrough.

20 Claims, 7 Drawing Sheets

(56) References Cited

FOREIGN PATENT DOCUMENTS

| JP | 2009-11967 A | | 1/2009 | |
|---|---|---|---|---|
| WO | 2013/133436 A1 | | 9/2013 | |
| WO | WO 2013/133436 | * | 7/2015 | ............... C08B 3/10 |

OTHER PUBLICATIONS

Ding—CN 1583796 A—MT—anhydride 2 to 8 to 1 NCC—2005 (Year: 2005).*
Habibi—Cellulose nanocrystalls—applications—esters—Chem. Rev. vol. 110—2010 (Year: 2010).*
Nakatsubo—WO 2013-133436 A1—ISR D#1—MT—nano nitrocellulose—2013 (Year: 2013).*
Wenjun—CN 102660050 A—IDS—MT—nano cellulose w-anhydride acetic sulfuric—2014 (Year: 2014).*
Belbekhouche et al., "Water sorption behavior and gas barrier properties of cellulose whiskers and microfibrils ilms", Carbohydrate Polymers, vol. 83, pp. 1740-1748, (2011).
Cerclier et al., "Elaboration of Spin-Coated Cellulose-Xyloglucan Multilayered Thin Films", Langmuir, vol. 26, No. 22, pp. 17248-17255, (2010).
Cerclier et al., "Xyloglucan-Cellulose Nanocrystal Multilayered Films: Effect of Film Architecture on Enzymatic Hydrolysis", Biomacromolecules, vol. 14, pp. 3599-3609, (2013).
Gu et al., "Roles of xyloglucan and pectin on the mechanical properties of bacterial cellulose composite films", Cellulose, vol. 21, pp. 275-289, (2014).
Huang et al., "Acetylation Modification of Rice Straw Fiber and Its Thermal Properties", Cellulose Chem. Technol., vol. 48, No. 3-4, pp. 199-207, (2014).
Jean et al., "Non-Electrostatic Building of Biomimetic Cellulose-Xyloglucan Multilayers", Langmuir, vol. 25, pp. 3920-3923, (2009).
Loo et al., "Recycling of Valueless Paper Dust to a Low Grade Cellulose Acetate: Effect of Pretreatments on Acetylation", BioResources, vol. 7, No. 1, pp. 1068-1083, (2012).
Saxena et al., "High Oxygen Nanocomposite Barrier Films Based on Xylan and Nanocrystalline Cellulose", Nano-Micro Letters, vol. 2, No. 4, pp. 235-241, (2010).
Ramirez et al., "Surface esterification of cellulose nanofibers by a simple organocatalytic methodology", Carbohydrate Polymers, 2014, vol. 114, pp. 416-426, XP029067326.
Vuoti et al., "Solvent impact on esterification and film formation ability of nanofibrillated cellulose", Cellulose, 2013, vol. 20, No. 5, pp. 2359-2370, XP055187595.
Lin et al., "Surface acetylation of cellulose nanocrystal and its reinforcing function in poly(lactic acid)", Carbohydrate Polymers, 2011, vol. 83, No. 4, pp. 1834-1842.

* cited by examiner

NCC FILMS AND PRODUCTS BASED THEREON

TECHNOLOGICAL FIELD

The invention generally contemplates uses of nanocrystalline cellulose (NCC) and products made therefrom.

BACKGROUND OF THE INVENTION

Xyloglucan is a widely distributed hemicellulose polysaccharide that is found in plant cell walls and seeds. In the cell wall, xyloglucan associates with cellulose microfibrils via hydrogen bonds, forming a cellulose-xyloglucan network. Xyloglucan is commercially obtained from the seeds of the tree *Tamarindus Indica*. Xyloglucan extracted from tamarind seed is a polysaccharide which has 1,4-β-D-glucan backbone partly substituted by 1,6-α-D-xylopyranosyl sidechains, some of which are further substituted by 1,2-α-D-galactopyranosyl residue. Xyloglucan has a high natural affinity to cellulose and it is a known strength enhancer of paper.

Xyloglucan can be added to the wet end of the paper production in low concentration about 1% improve the mechanical properties of the produced paper. Commercial xyloglucan may be obtained from various sources, also in pure form. The commercial xyloglucan that is obtained from seeds is called tamarind kernel powder (TKP) and is considered as a waste product. Except xyloglucan, the TKP also contains proteins, lipids, fibers and ash.

Chemical modification of nanocrystalline cellulose (NCC) is necessary in order to disperse the nanocrystals in hydrophobic solvents/polymers. There are many different approaches to modifying NCC and to creating more hydrophobic surfaces of the cellulose nanocrystals, such approaches include electrostatic interactions between the sulfate half-esters of the NCC with quaternary ammonium salts or fatty amines; acid catalyzed Fisher esterfications using organic acids from acetic acid to more hydrophobic acids; and silylation of the NCC using organic amines in gas phase or in solvents. Organic acid derivatives may also be used as hydrophobic derivatives; these include anhydrides or acid chlorides formed by base catalysis.

BACKGROUND PUBLICATIONS

[1] US Patent Application No. 20140065406
[2] US Patent Application No. 20150017432
[3] US Patent Application No. 20110283918
[4] Belbekhouche, Sabrina, et al. "Water sorption behavior and gas barrier properties of cellulose whiskers and microfibrils films." Carbohydrate Polymers 83.4 (2011): 1740-1748.
[5] Cerclier, Carole, et al. "Elaboration of spin-coated cellulose-xyloglucan multilayered thin films." Langmuir 26.22 (2010): 17248-17255.
[6] Jean, Bruno, et al. "Non-Electrostatic Building of Biomimetic Cellulose-Xyloglucan Multilayers." Langmuir 25.7 (2008): 3920-3923.
[7] Cerclier, Carole V., et al. "Xyloglucan-cellulose nanocrystal multilayered films: effect of film architecture on enzymatic hydrolysis." Biomacromolecules 14.10 (2013): 3599-3609.
[8] Gu, Jin, and Jeffrey M. Catchmark. "Roles of xyloglucan and pectin on the mechanical properties of bacterial cellulose composite films." Cellulose 21.1 (2014): 275-289.
[9] Saxena, Amit, et al. "High oxygen nanocomposite barrier films based on xylan and nanocrystalline cellulose." Nano-Micro Letters 2.4 (2010): 235-241.
[10] Cellulose Chem. Technol., 48 (3-4), 199-207 (2014).
[11] BioResources, 7(1), 1068-1083 (2012).
[12] U.S. Pat. No. 5,608,050

GENERAL DESCRIPTION

Physical barriers, films or material yarns and sheets may be used as packing materials, e.g., for protection against external agents that attack and deteriorate contents of product. The search for packaging materials with improved barrier properties is driven by need to overcome, inter alia, the degradability process of foods, and to make their trade and distribution more efficient and cost effective. The rise of new packaging materials is closely linked to the search for a lasting protection of packaging contents against external agents, particularly gases such as oxygen, water vapor, and also against fats, chemicals, odors and flavors, as well as for preventing gases, water vapor and aromas from escaping the package.

The main two external agents most commonly to be kept out with barriers are moisture and gases. Achieving a good moisture barrier is relatively easy for plastics. Barrier to gases is a more complex task.

Oxygen-barrier capabilities and otherwise vapor and gas impermeability are also highly unique and distinguishable characteristics of films. As demonstrated herein, a thin NCC layer according to the invention (1-2 μm), coating a plastic film (e.g. BOPP), reduced oxygen transmission rate by 3 orders of magnitude. Barrier capabilities of NCC coatings are on a par with those of EVOH; however, the advantages of the NCC coatings of the invention exceed those of EVOH barriers in their simplicity of application and their lowered degradability.

When seeking to enforce existing materials as barriers for preventing penetration therethrough by, e.g., a gaseous material, surface coating of an existing packaging materials can be the most resource-effective method. Products of the invention are suitable to be used as materials for surface coatings and are suggested as bio-based, recyclable alternatives to other known materials such as PVdC. The materials of the invention can be applied to any kind of a substrate, such as paper, metal foil or plastics, from solutions or other liquid dispersions. When the coating is very thin, less than 5% of the total finished film thickness, the substrate may be regarded as a single layer material.

Formulations of the invention can be applied as water-based coatings to plastic films such as biaxially-oriented polypropylene (BOPP) and polyester (PET). A coating comprising the materials of the invention increases the barrier properties of the films, reducing the permeability of the films to oxygen and other agents such as flavors and aromas, thus extending the shelf-life of food products contains inside the packages. Unlike the majority of liquid high barrier materials that are applied in a dedicated coating process, the formulations of the invention can be applied by in-line roll-to-roll methods commonly used in the flexible packaging industry, like flexo, gravure or litho-coating processes.

NCC formulation according to the invention can be applied to a substrate by various methods, mostly by roll-coating, in which the material is applied by contacting a moving web with a rotating applicator roll. The applicator roll picks up coating from an appropriate source, either another roll or a bath, and transfers it to the substrate web. In the next step, suspending water of the coating is evaporated in a drying oven where the particles, that become coalesced and the coating is further solidified.

Without wishing to be bound by theory, as liquid crystalline NCC gains its highly ordered molecular structure upon drying, the rigid rod-like particles are aggregated by aligning in parallel to each other, thereby forming a self-reinforced structure, facilitated by hydrogen bonding, with high mechanical and barrier properties.

The length of the drying process determines when the coated substrate can be further processed or recoiled. Accelerating the development of a coating's early performance characteristics allows for increased productivity and enables the coating line to run faster with a lower energy consumption.

The inventors of the technology disclosed herein, have developed barrier materials that may be generally used in three main ways:

Homogeneous layers, as single materials, mixtures or blends;
Coextruded or laminated multilayer structures; and
Coated barriers on surfaces of substrates.

The barrier materials of the invention are sheets or films based on modified or unmodified nanocrystalline cellulose (NCC), also known as crystalline nanocellulose (CNC), optionally in combination with one or more other materials which endows the NCC material with improved mechanical, physical and chemical properties. Products according to the invention, such as films, coatings and material sheets, may be used as physical barriers or as functional barriers and thus may find use in a variety of applications.

Nanocrystalline cellulose (NCC) are fibers produced from cellulose; the NCC are typically high-purity single crystals. They constitute a generic class of materials having mechanical strengths equivalent to the binding forces of adjacent atoms. The resultant highly ordered structure produces not only unusually high strengths but also significant changes in electrical, optical, magnetic, ferromagnetic, dielectric, conductive, and even superconductive properties. The tensile strength properties of NCC are far above those of the current high volume content reinforcements and allow the processing of the highest attainable composite strengths.

In some embodiments, the NCC is characterized by having at least 50% crystallinity. In further embodiments, the NCC is monocrystalline.

In some embodiments, the NCC, produced as particles (e.g., fibrils, or in other cases as crystalline material) from cellulose of various origins, is selected to be at least about 100 nm in length. In other embodiments, they are at most about 1,000 μm in length. In other embodiments, the NCC particles are between about 100 nm and 1,000 μm in length, between about 100 nm and 900 μm in length, between about 100 nm and 600 μm in length, or between about 100 nm and 500 μm in length.

In some embodiments, the NCC particles are between about 100 nm and 1,000 nm in length, between about 100 nm and 900 nm in length, between about 100 nm and 800 nm in length, between about 100 nm and 600 nm in length, between about 100 nm and 500 nm in length, between about 100 nm and 400 nm in length, between about 100 nm and 300 nm in length, or between about 100 nm and 200 nm in length.

The thickness of the NCC material may vary between about 5 nm and 50 nm.

The fibrils of NCC may be selected to have an aspect ratio (length-to-diameter ratio) of 10 and more. In some embodiments, the aspect ratio is 67-100.

In some embodiments, the NCC is selected to be between about 100 nm and 400 nm in length and between about 5 nm and 30 nm in thickness.

The NCC may be used as commercially available or may be prepared according to known methodologies such as the process described in WO 2012/014213 or its equivalent US application, herein incorporated by reference.

As used herein, NCC materials of the invention or which are utilized according to the invention are selected from NCC esters, e.g., NCC acetate; cross-linked NCC; NCC dialdehyde; NCC combined with at least one hemicellulose, e.g., xyloglucan; and NCC ester combined with at least one hemicellulose, e.g., xyloglucan.

In a first aspect, there are provided NCC materials according to the invention.

In another aspect, there are provided formulations or compositions comprising NCC materials according to the invention.

In a further aspect, there are provided films and coats comprising or consisting at least one material according to the invention.

In another aspect, there are provided products comprising at least one film or coat according to the invention.

Also provided are multi-stacked structures comprising at least one film according to the invention.

In some embodiments, the NCC material of the invention is NCC ester. Thus, the invention provides NCC ester, formulations comprising same, a process for its preparation and products made therefrom.

The industrial process for the production of cellulose acetate uses acetic acid and acetic anhydride mixtures with sulfuric acid as a catalyst. The reaction can be performed in a heterogeneous way or by using organic solvents to increase chemical modification. The amount of modification and the degree of substitution needs to be high in order to dissolve the modified cellulose in an organic solvent. Usually a degree of substitution (DS), i.e., the average number of acetyl groups on each monosaccharide unit, of above 2 is required to obtain a cellulose ester soluble in acetone (Table 1). To be able to dissolve the cellulose in hydrophobic organic solvents, the DS needs to be between about 2 and 3.

TABLE 1

Solubility (+ soluble, − insoluble) of cellulose acetate in various solvents, varied based on the material DS values. (Esterifications of polysaccharides, Thomas Heinze, Tim Liebert and Andreas Koshella. DOI 10.1007/b98412)

| Cellulose acetate, DS | Chloroform | Acetone | 2-Methoxyethanol | Water |
|---|---|---|---|---|
| 2.8-3.0 | + | − | − | − |
| 2.2-2.7 | − | + | − | − |
| 1.2-1.8 | − | − | + | − |
| 0.6-0.9 | − | − | − | + |
| <0.6 | − | − | − | − |

For such DS values, the amount of acetic anhydride required is at least 3 times the weight of the cellulose and the amount of sulfuric acid required should be between 6% and 20%, based on the dry weight of the cellulose. This is summarized in Table 2 below, providing reference to each of the bibliographic sources.

TABLE 2

Conditions specified for the production of hydrophobic celluloses, in comparison to the process of the invention for producing NCC ester.

|                      | Cellulose (g) | Acetic acid (mL) | Acetic anhydride (mL) | Sulfuric acid (g) |
|----------------------|---------------|------------------|-----------------------|-------------------|
| [10]                 | 1             | 10               | 3                     | 0.09              |
| [11]                 | 1             | 18               | 5                     | 0.1               |
| [12]                 | 1             | 11.5             | 3.5                   | 0.05-0.4          |
| NCC ester of the invention | 1       | 5-20             | 1-2                   | 0.01              |

The dispersion of NCC in a reaction medium during chemical modification is important to obtain homogenously modified nanocrystals, which can be dispersed in organic solvents. Water and DMSO and also ionic liquids are known to disperse NCC. However, water is not a solvent of choice for the Fischer esterification method and DMSO is not a solvent to be used with anhydrides or acetyl chlorides, as use of such solvents leads to the destruction of the reagent and also for oxidation reactions. Ionic liquids are expensive and recycling is problematic due to their high boiling point.

Thus, when aiming at providing an improved system for esterification of NCC, the processes utilized for forming cellulose esters cannot be simply modified to obtain NCC ester with improved properties, in pure or substantially pure form. When employing the Fischer esterification method, the inventors of the present technology have realized that while hot acetic acid was capable of dispersing the NCC, the reaction was not effective as colored NCC having poor homogeneity was obtained. Thus, a different approach was necessary to cure the deficiencies associated with existing processes as summarized above.

The inventors of the invention disclosed herein have developed a different approach which not only could be easily scaled up for industrial production of hydrophobic NCC (NCC esters), but also provides such hydrophobic NCC in high yield, purity and constitution that are equivalent or comparable with the original NCC. The process of the invention generally contemplates the use of small amounts of acetic anhydride, or any other anhydride, as may be the case, wherein the amount of each of the anhydrides used (one or more) not exceeding twice the amount of the NCC present, and which are much smaller as compared to those used in processes known and available for the synthesis of cellulose acetate (Table 2). According to the invention, acetic anhydride or any other suitable acid anhydride is allowed to react directly with the hydroxyl groups of cellulose nanocrystals, in the presence of an acid, such as sulfuric acid, as a catalyst. The temperature and time needed to carry out the reaction to completion are greatly reduced. The crucial element of the process is to keep the amounts of acetic anhydride and sulfuric acid as low as possible. Larger amounts of either introduced impurities and resulted in undesired modifications to the properties of the crystalline structure.

Thus, the invention provides a process for manufacturing NCC ester, e.g., acetate, the process comprising treating NCC with an ester source (being for example acetic acid and/or acetic anhydride and/or hexanoic acid, or any of the anhydrides disclosed herein), in the presence of (sometimes a catalytic amount of) at least one acid, under conditions permitting formation of NCC ester.

In some embodiments, the at least one acid utilized, in some embodiments, in catalytic amounts, is selected from mineral acids and organic acids. In some embodiments, the at least one acid is a mineral acid such as HCl, $H_3PO_4$, $H_2SO_4$, perchloric acid and others. In other embodiments, the at least one acid is an organic acid such as p-toluene sulfonic acid, citric acid, tartaric acid and others.

In some embodiments, the at least one acid is a mineral acid. In some embodiments, the mineral acid is HCl, $H_3PO_4$ or $H_2SO_4$. In some embodiments, the mineral acid is $H_2SO_4$.

The amount of the at least one acid to be utilized in a process of the invention may vary depending, inter alia, on the specific conditions employed, the selected acid or acid combinations, the ester, e.g., acetate source and other parameters. In some embodiments, the amount of acid utilized is between 0.01% and 10% (wt) compared to the amount of cellulose in the reaction. In some embodiments, the amount of acid is between 0.01% and 9%, between 0.01% and 8%, between 0.01% and 7%, between 0.01% and 6%, between 0.01% and 5%, between 0.01% and 4%, between 0.01% and 3%, between 0.010% and 2%, between 0.010% and 10%, between 0.10% and 10%, between 0.1% and 9%, between 0.1% and 8%, between 0.1% and 7%, between 0.1% and 6%, between 0.1% and 5%, between 0.1% and 4%, between 0.1% and 3%, between 0.1% and 2%, or between 0.1% and 1%.

In some embodiments, the amount of the at least one acid is between 0.1% and 5%, compared to the amount of the NCC.

In some embodiments, the at least one acid is sulfuric acid and the amount thereof being as defined above or between 0.1% and 5%, compared to the amount of the NCC.

In some embodiments, the at least one acid is sulfuric acid and the amount thereof being as defined above or between 0.1% and 1%, compared to the amount of the NCC.

In some embodiments, the at least one acid is sulfuric acid and the amount thereof is between 0.5% and 1%, compared to the amount of the NCC.

In some embodiments, the ester source is selected amongst such materials which upon reaction with the hydroxyl groups on the NCC yield an ester. Thus, the ester source is a material selected from at least one acid anhydride, at least one carboxylic acid, at least one carboxylate and at least one acyl halide.

In some embodiments, the ester source is at least one acid anhydride and/or at least one carboxylic acid. In some embodiments, the ester source is at least one acid anhydride or at least one carboxylic acid. In some embodiments, the ester source is a combination of at least one acid anhydride and at least one carboxylic acid.

Thus, the invention provides a process for manufacturing NCC ester, the process comprising treating NCC with at least one acid anhydride, in the presence of at least one acid, under conditions permitting formation of the NCC ester, the at least one acid being between 0.01% and 10% (wt) relative to the amount of the NCC.

A process of the invention for manufacturing nanocrystalline cellulose (NCC) ester comprises treating NCC with at least one anhydride and at least one carboxylic acid in the presence of sulfuric acid, at a temperature between 40 and 110° C., wherein the amount of the sulfuric acid is between 0.01% and 1%, compared to the weight of NCC and wherein the ratio of each of the at least one carboxylic acid to NCC is between 5-20 to 1 and the ratio of each of the at least one anhydride to NCC is between 0.5-2 to 1.

In some embodiments, the process of the invention for manufacturing nanocrystalline cellulose (NCC) ester comprises treating NCC with at least one anhydride and at least one carboxylic acid in the presence of sulfuric acid, at a temperature between 40 and 110° C., wherein the amount of the sulfuric acid is between 0.01% and 1%, compared to the weight of NCC and wherein the ratio of the at least one carboxylic acid to NCC is between 5-20 to 1 and the ratio of each of the at least one anhydride to NCC is between 0.5-2 to 1.

In some embodiments, the process of the invention for manufacturing nanocrystalline cellulose (NCC) ester comprises treating NCC with at least one anhydride and at least one carboxylic acid in the presence of sulfuric acid, at a temperature between 40 and 110° C., wherein the amount of the sulfuric acid is between 0.01% and 1%, compared to the weight of NCC and wherein the ratio of the at least one carboxylic acid to NCC is between 5-20 to 1 and the ratio of the at least one anhydride to NCC is between 0.5-2 to 1.

In some embodiments, as stated herein, the process may involve the use of one or more carboxylic acid materials and/or one or more anhydride.

In some embodiments, the at least one anhydride is selected from acetic anhydride, propionic anhydride, butanoic anhydride, pentanoic anhydride, hexanoic anhydride, heptanoic anhydride, octanoic anhydride, maleic anhydride, higher anhydride homologues and substituted acid anhydrides.

In some embodiments, the acid anhydride is acetic anhydride. In other embodiments, the at least one acid anhydride is different from acetic acid.

In some embodiments, the at least one anhydride is selected from acetic acid, propionic acid, butanoic acid, pentanoic acid, hexanoic acid, heptanoic acid, octanoic acid, acrylic acid, methacrylic acid, pyruvic acid, isobutyric acid, crotonic acid, vinylacetic acid, tetrolic acid, ketobutyric acid, acetoacetic acid, pivalic acid, furoic acid, benzoic acid, sorbic acid, phthalic acid, capric acid and higher acid homologs and substituted acids.

The invention also provides a process for manufacturing NCC ester, the process comprising treating NCC with at least one carboxylic acid, in the presence of at least one acid, under conditions permitting formation of the NCC ester, the at least one acid being between 0.010% and 10% (wt) relative to the amount of the NCC.

The invention further provides a process for manufacturing NCC ester, the process comprising treating NCC with at least one acid anhydride and at least one carboxylic acid, in the presence of at least one acid, under conditions permitting formation of the NCC ester, the at least one acid being between 0.01% and 10% (wt) relative to the amount of the NCC.

The conditions permitting formation of the NCC ester may vary, inter alia, based on the amount of NCC to be converted, the degree of conversion desired and other parameters. In some embodiments, the process is carried out at ambient pressure. In some other embodiments, the temperature of the reaction mixture is maintained for a time sufficient to complete conversion of the NCC to the corresponding acetate. In some embodiments, the temperature is between 50 and 110° C. In some embodiments, the temperature is below 110° C. In other embodiments, the temperature is between 50 and 110° C., between 50 and 100° C., between 50 and 90° C., between 50 and 80° C., between 50 and 70° C., between 60 and 110° C., between 60 and 100° C., between 60 and 90° C., between 60 and 80° C., between 60 and 70° C., between 70 and 110° C., between 70 and 100° C., between 70 and 90° C., between 70 and 80° C., between 80 and 110° C., between 80 and 100° C., or between 80 and 90° C.

The reaction may be carried out for a period of time sufficient for completion. In some embodiments, the reaction is carried out for a time period between several minutes to several hours.

Thus, the invention provides a process for manufacturing NCC ester, the process comprising treating NCC with at least one ester source, e.g., an anhydride, in the presence of at least one acid, at a temperature between 40 and 110° C., the at least one acid being between 0.01% and 10% (wt) relative to the amount of the NCC.

In some embodiments, the process for manufacturing NCC ester comprises treating NCC with at least two ester sources, in the presence of at least one acid, at a temperature between 40 and 110° C., the at least one acid being between 0.01% and 10% (wt) relative to the amount of the NCC.

In some embodiments, the at least two ester sources are selected from two or more different acid anhydrides and two or more different carboxylic acids, or mixtures thereof. In some embodiments, the at least two ester sources comprise at least one anhydride and at least one carboxylic acid. In some embodiments, the at least one anhydride is acetic anhydride. In some embodiments, the at least one carboxylic acid is acetic acid. In some embodiments, the at least two ester sources comprise acetic anhydride and acetic acid.

In some embodiments, the process for manufacturing NCC ester comprises treating NCC with acetic acid and acetic anhydride, in the presence of at least one acid, at a temperature between 40 and 110° C.

In some embodiments, the process for manufacturing NCC ester comprises treating NCC with a carboxylic acid and an anhydride (such as a combination of acetic acid and acetic anhydride), wherein the ratio of the amount of each carboxylic acid used to NCC is between 5 and 20 (to 1 NCC) and the ratio of the amount of each anhydride used to NCC is between 0.5 and 2 (to 1 NCC).

In some embodiments, the process for manufacturing NCC ester comprises treating NCC with acetic acid and acetic anhydride, wherein the ratio of acetic acid to NCC is between 5 and 20 (to 1 NCC) and the ratio of acetic anhydride to NCC is between 0.5 and 2 (to 1 NCC).

In some embodiments, the ester source is or comprises at least one acid anhydride. Examples of acid anhydrides include acetic anhydride, propionic anhydride, butanoic anhydride, pentanoic anhydride, hexanoic anhydride, heptanoic anhydride, octanoic anhydride, higher anhydride homologues and substituted acid anhydrides. In some embodiments, the acid anhydride is acetic anhydride. In other embodiments, the at least one acid anhydride is different from acetic acid.

Other anhydrides can be used to add functional groups to the NCC surface. For example, polymerizable anhydrides may be utilized. In some embodiments, the polymerizable anhydride comprises at least one polymerizable group such as an acrylate group, a group containing one or more carbon-carbon double bond or triple bonds, and others. For example, methacrylic anhydride may be utilized for providing a methacrylated NCC surface; succinic anhydride and maleic anhydride will similarly result in the addition of carboxylic groups onto the NCC surface.

The invention also provided NCC esters such as NCC acetate, NCC methacrylate and NCC hexanoate and formulations comprising same.

The NCC ester is characterized by ester groups formed on one or more of the hydroxyl groups of NCC. The degree of esterification may be tailored to meet a desired property. In some embodiments, 100% of the NCC hydroxyl groups are esterified. In other embodiments, at least 10% of the hydroxyl groups are esterified. In other embodiments, at least 10, 15, 20, 25, 30, 35, 40, 45, 50, 55, 60, 65, 70, 75, 80, 85, 90 or 95% of the hydroxyl groups are esterified. In some embodiments, 90, 91, 92, 93, 94, 95, 96, 97, 98 or 99% of the hydroxyl groups are esterified.

The esterified NCC of the invention may be formed into a variety of forms, including 3D and substantially (highly thin)-2D materials, such as thin films. The material and films of the invention are highly distinguishable from those of the art. The NCC ester films are not re-dispersible in solvents (such as water, ethanol, acetone, ethyl acetate, methylene chloride, toluene, hexane), are transparent and flexible. Films made of NCC ester of the invention are not destructible or damageable when contacted with such solvents and may thus be used as supreme protection layers and coating materials.

Formulations of the NCC esters of the invention, in an organic solvent such as ethanol, were formed to enable coating on different surfaces, e.g., for the purpose of reducing friction. The formulations typically contained between 0.1 and 5% (wt %) NCC ester. In some embodiments, the amount of the NCC ester in solution was between 0.1-0.5%. In some embodiments, the amount of the NCC ester was between 0.2-0.5%, between 0.3-0.5%, between 0.4-0.5%, between 0.1-1%, between 0.2-1%, between 0.3-1%, between 0.4-1%, between 0.5-1%, between 0.6-1%, between 0.7-1%, between 0.8-1% or between 0.9-1%. In some embodiments, such solutions are ethanolic solutions and the NCC ester is NCC acetate.

The NCC acetate of the invention may thus be characterized as having one or more of the following:
1. may be formed into thin films;
2. is insoluble in an aqueous or organic solvent (after drying to form a film);
3. when formed into films provides fully transparent products;
4. flexible as a thin film;
5. films made of the material exhibit gas barrier capabilities, e.g., oxygen gas barrier;
6. may be used as a coating on a great variety of materials (e.g. plastics);
7. may be used inside foams;
8. may be dispersed in certain organic solvents (methanol, acetone, MEK, DCM);
9. may be dispersed in monomer solutions (e.g. acrylic monomers);
10. may be dispersed in certain polymers (e.g. PMMA).

Further contemplated is NCC acetate manufactured according to the process of the invention.

The NCC acetate may be additionally utilized in the manufacture of foams and aerogels, for better performances in humid environments, or as reinforcing components in composite materials in which the matrix is not hydrophilic.

The NCC acetate, as other NCC esters of the invention, may be formed into multi-stacked structures, as further detailed herein.

For certain applications, in order to provide films and barrier structures that achieve effective barrier properties, NCC formulations must comprise high concentrations of NCC, e.g., in some embodiments, concentration that are greater than 8% (at least 8%). As NCC dispersions usually contain low solid content of up to 5% or usually up to 3% in water, the ability to increase the solid content depends on the addition of additives. The inventors have successfully increased the amount of solids in such solutions by combining the NCC with a hemicellulose, such as xyloglucan.

When such formulations were formed, the solid content was doubled or trebled to 10% or more.

Increasing the solid content to 10% or more could be similarly achieved by combining NCC with any other compatible material, selected from soluble starch, low molecular PVOH, and other low molecular polysaccharides, such as water soluble cellulose derivatives. Increasing coating concentration to 10% and higher shortened processing times of barriers materials made therefrom by reducing, e.g., drying periods after application.

In some embodiments, the NCC material of the invention is NCC or NCC ester in combination with at least one hemicellulose, e.g., xyloglucan.

In some embodiments, the formulation comprises NCC, modified or unmodified as disclosed herein, and at least one hemicellulose, e.g., xyloglucan.

Formulations comprising NCC and at least one hemicellulose, e.g., xyloglucan, may be combined with at least one additional material, such as cellulose or cellulose pulp, or cellulose derivatives (e.g. carboxymethyl cellulose, cellulose acetate), nanocellulose materials (e.g. NFC), polymers (e.g. PEG, PVA), preservatives (e.g. sodium benzoate, sorbic acid), detergents (e.g. CTAB, SDS), plasticizers (e.g. glycerol, polycarboxylate ether) and others.

Thus, the invention further provides a formulation comprising NCC and at least one material selected from hemicellulose, soluble starch, polysaccharides and cellulose derivatives.

In some embodiments, the formulation comprises NCC and at least one material selected from hemicellulose, being in an amount up to 20 times the NCC weight; soluble starch, being in an amount up to 20 times the NCC weight; polysaccharides, being in an amount up to 40 times the NCC weight; and cellulose derivatives, in an amount up to 20 times the NCC weight.

In some embodiments, the formulation is aqueous or containing water or water-based.

In some embodiments, the formulation comprises modified (e.g., NCC ester) or unmodified NCC and at least one hemicellulose.

In some embodiments, the formulation comprises modified or unmodified NCC and at least one hemicellulose, wherein the combined amount of the NCC and at least one hemicellulose is at least 10 wt %. In some embodiments, the ratio or NCC to the at least one hemicellulose is 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, and 1:1.

In some embodiments, the formulation comprises modified or unmodified NCC and at least one hemicellulose, wherein the amount of the NCC is between 2 and 9% and the amount of the at least one hemicellulose is between 1 and 8 wt %.

In some embodiments, the hemicellulose is selected from glucuronoxylan, arabinoxylan, glucomannan, galactoglucomannan and xyloglucan. In some embodiments, the hemicellulose is xyloglucan.

In some embodiments, the hemicellulose is not xylan.

In some embodiments, the xyloglucan is tamarind kernel powder (TKP) or is derived from tamarind kernel powder (TKP). In some embodiments, the TKP is obtained as disclosed herein. Generally speaking, the xyloglucan level in tamarind kernel powder is between about 20%-50%. The tamarind kernel powder can be used as is or pre-purified before use to remove proteins and lipids which may be present.

In some embodiments, TKP containing 20%-50% xyloglucan was used as is. Solutions made of this TKP were not fully transparent and the viscosity of a 4% solution in water was 4,000-7,000 cP. This grade of TKP was used, for example, for foam applications, for which the required xyloglucan level was 20%-100%.

In some embodiments, semi-clean TKP which contains 45%-70% xyloglucan, was used. Solutions made of this TKP were fully transparent and the viscosity of a 4% solution in water was 2,000-4,000 cP. This grade of TKP was used, for example, for foam applications, and also for forming films and coatings for which the required xyloglucan level was 45%-100%

In other embodiments, clean TKP, containing above 70% xyloglucan, was used. Solutions made of this TKP were fully transparent and the viscosity of a 4% solution in water was <2,000 cP. This grade of TKP was used, for example, for foam applications, and also for fine films and coatings for which the required xyloglucan level was 70%-100%.

Thus, in some embodiments, the TKP is selected based on its xyloglucan content. In some embodiments, the TKP is selected to comprise between 20 and 50% xyloglucan, between 20 and 100% xyloglucan, between 45 and 70% xyloglucan, between 45 and 100% xyloglucan, between 70 and 100% xyloglucan, above 20% xyloglucan, above 40% xyloglucan, above 50% xyloglucan, above 60% xyloglucan, above 70% xyloglucan, above 80% xyloglucan or above 90% xyloglucan.

The invention further provides a formulation for use in the formation or construction of films or coatings on a substrate, as defined, the formulation comprising NCC and xyloglucan.

The hemicellulose may be alternatively or additionally used in combination with cellulose fibers. Cellulose fibers such as those in the form of wood pulp have strong tendency of forming hydrogen bonds, leading to aggregation (Klemm, D., Schmauder, H.-P., Heinze, T. 2005. Cellulose. Biopolymers Online. Chapter 6). As a result fiber dispersions used in paper production are limited to low concentrations. In order to form homogenous products such as paper, the fiber/water suspension is further diluted to around 1% w/v concentration.

It was found that a hemicellulose such as xyloglucan, e.g., from TKP, together with pulp, formed a well dispersed mixture suitable for foaming, especially when a high hemicellulose level was used as compared to the pulp. A hemicellulose level between 10 and 30%, compared to the dry weight of the cellulose, achieved uniform pulp mixtures with high viscosities which are suitable for foaming. Thus, the use of hemicellulose enables formation of stable pulp products, demonstrating diminished aggregation. In fact, low concentrations of the hemicellulose, e.g., of a few percent, did not disperse the cellulose evenly and lumps of aggregated cellulose appeared.

The ability to form stable, aggregation-free, cellulose dispersions seems to stem from the fact that the hemicellulose serves as a matrix for the cellulose fibers, making homogenous dispersions of 3% w/v and more of cellulose in water. These suspensions can be further manipulated or used for foaming.

Thus, the invention further provides an aqueous dispersion of cellulose fibers and at least one hemicellulose, the dispersion comprising at least 3% w/v cellulose and between 10 and 30% of said at least one hemicellulose, compared to the dry weight of the cellulose.

In another aspect there is provided a foam material comprising cellulose fibers and at least one hemicellulose.

In another aspect, the invention provides a dry or semi-dry product comprising or consisting a foam material comprising cellulose fibers and at least one hemicellulose.

The invention further provides use of at least one hemicellulose in a method of forming a cellulose-based foam material.

The cellulose fibers may be of any type known. Non limiting examples include wood pulp, such as hardwood, softwood; mechanical pulp; thermo-mechanical pulp or dissolving pulp. Additional non limiting example is cellulose fibers from paper production waste and might include impurities such as $CaCO_3$, ink residues or other impurities. Other non-limiting examples for cellulose fibers that can be used include flax, jute, hemp and cotton.

The dispersion comprising hemicellulose, e.g., xyloglucan and cellulose or generally pulp may be further manipulated or used to form foam materials. The foaming process generally includes dispersion of cellulose fibers in the hemicellulose, e.g., xyloglucan solution, while mixing. To the pulp-xyloglucan mixture various additives may be added e.g., NCC (or CNC) or nano-fibrillated cellulose (CNF). These nanocelluloses may be used to further increase the strength properties of the final foams depending on their loading levels.

Thus, alternatively, a formulation comprising NCC and at least one hemicellulose, e.g., xyloglucan, as described herein, may be combined with cellulose or pulp to form foam materials, as described herein. In some embodiments, the hemicellulose is not xylan.

Water-soluble flame retardants e.g., inorganic phosphates, boric acid, borax, amine salts, organic amines and metal hydroxides may also be used. Cellulose crosslinking agents may also be added to the foaming process to enhance the mechanical properties of the foams.

The foaming may be achieved in the presence of at least one surfactant and with the aid of mixing, so as to entrap air bubbles in the mixture. The surfactants can be anionic (SDS), cationic (CTAB) or neutral PEG based surfactants (TWEEN). Commercial detergents for laundry, dishwashing and hygiene can also be used. The volume of the foam can be adjusted by the amount of surfactant/detergent and or mixing speed. The foam volume will also determine the final density of the foam if the amount of solids is known in the foam.

The foam can then be applied to containers with specific dimensions. The foam may then be frozen and thawed in ethanol or any other organic solvent that is miscible with water to precipitate the hemicellulose, e.g., xyloglucan and remove most of the water. The ethanol soaked foam may then be oven dried at a high temperature above 100° C. to obtain low density foams.

Alternatively, after foaming the water may be removed by direct oven drying at 120° C. or at higher temperatures. By a different method, the drying involves placing the foam directly in an organic solvent miscible with water to precipitate the xyloglucan and to extract out the water from the foam and replace it with the organic solvent. The organic solvent can then be removed by heating.

In another aspect, the invention provides a cross-linked NCC material, the material being formed by cross-linking NCC dialdehyde, at least one hemicellulose and at least one cross-linking agent.

In some embodiments, the NCC dialdehyde is pre-prepared. In some embodiments, the NCC dialdehyde is prepared in situ, thus the cross-linked NCC may be formed by reacting NCC and at least one oxidizer, in the presence of at least one hemicellulose and at least one cross-linking agent.

In some embodiments, the at least one hemicellulose is TKP, as defined herein. In some embodiments, the at least one hemicellulose is xyloglucan. In some embodiments, the at least one hemicellulose is pure xyloglucan.

In some embodiments, the cross-linking is further carried out in the presence of at least one additive selected from cellulose, cellulose pulp, cellulose derivatives (e.g. carboxymethyl cellulose, cellulose acetate), at least one additional nanocellulose materials (e.g. NFC), at least one foaming material (e.g., a detergent material), at least one surfactant, at least one polymer (e.g. PEG, PVA), at least one preservative (e.g. sodium benzoate, sorbic acid), at least one detergent (e.g. CTAB, SDS), at least one plasticizer (e.g. glycerol, polycarboxylate ether), at least one liquid carrier, at least one filler and others.

The at least one cross-linking agent is selected from materials which contain two or more reactive ends capable of chemically attaching to the aldehyde groups on the NCC. In some embodiments, cross-linking is achieved by a polyamine (three or more amine groups) or a diamine molecule selected amongst organic amines, sterically hindered amines and amine salts. In some embodiments, the diamine is a hydrazide.

Non-limiting examples of such cross-linking materials include carbazic acid amide, N-ethyl carbazic acid amide, N-ethyl-N-propyl carbazic acid amide, N-capryl-N-lauryl carbazic acid amide, t-butyl carbazate, ethyl carbazate, methyl carbazate, phenyl carbazate, myristyl carbazate, benzoic acid hydrazide, stearic acid hydrazide, oxamic acid hydrazide, phenyl acetic acid hydrazide, palmitic acid hydrazide, oxalic acid dihydrazide, succinic acid dihydrazide, adipic acid dihydrazide and others.

In some embodiments, the at least one cross-linking agent is adipic acid dihydrazide.

The at least one oxidizer is selected to be capable of oxidizing the NCC into the correspond aldehyde or dialadehyde. In some embodiments, the at least one oxidizer is selected from sodium periodate, periodic acid, o-iodoxybenzoic acid, tetrapropylammonium perruthenate, urea-hydrogen peroxide, TEMPO-derived reagents and compositions, pyridinium chlorochromate, permanganate materials and others.

In some embodiments, the oxidizer is sodium periodate or periodic acid.

In some embodiments, the cross-linking process comprises mixing at least one hemicellulose, e.g., xyloglucan and NCC in the presence of at least one oxidizer under conditions permitting oxidation of a plurality of hydroxyl groups of the NCC into the corresponding aldehydes, and thereafter adding at least one cross-linking agent.

In some embodiments, the cross-linking process alternatively comprises mixing pre-prepared NCC aldehyde or dialdehyde (Yang, Xuan, and Emily D. Cranston. "Chemically cross-linked cellulose nanocrystal aerogels with shape recovery and superabsorbent properties." Chemistry of Materials 26.20 (2014): 6016-6025), with at least one hemicellulose and at least one cross-linking agent to thereby cause cross-linking of the NCC aldehyde with the hemicellulose.

In some embodiments, for certain applications, the cross-linking process may be carried out in the presence of at least one additive, as defined, introduced prior to completion of NCC oxidation (in case oxidation to the corresponding aldehyde is achieved in situ) or prior to completion of the cross-linking.

In some embodiments, the at least one additive is cellulose pulp or a cellulose derivative. In cases where the cellulose pulp or cellulose derivative is added to the reaction mixture in the presence of at least one oxidizer, oxidation of the cellulose pulp or cellulose derivatives may also ensue; thereby achieving also cross-linking of the cellulose materials with the NCC.

The cross-linked NCC may be used for the preparation of products as disclosed herein, e.g., foams.

The invention further provides films and solid products comprising NCC materials of the invention, said films or products are optionally formed on a surface region of a substrate for controlling (minimizing or diminishing) penetration of materials therethrough, for modulating surface hydrophobicity, modulating surface friction and modifying one or more other mechanical or physical or chemical properties of a material.

In some embodiments, the NCC materials of the invention may be formed into barrier materials in the shape of continuous sheets or material films. As known in the art, barriers are defined by a general measure of the amount of moisture or gases that the materials let through, at a defined temperature and pressure, for 24 hours. The standard measure is the oxygen transmission rate, OTR, expressed in cubic centimeters, at 20° C., for 1 μm thickness, per $m^2$, per 24 hours, at atmospheric pressure, measured at 0% relative humidity. Barriers according to the invention, formed by application of NCC formulation according to the invention, have been shown to reduce OTR of biaxially-oriented polypropylene (BOPP) from 1,500 to 1 ($cc/m^2 \cdot day \cdot atm$).

Formation of a self-standing film that may be used as a barrier sheet involves drying NCC material on a substrate (e.g. glass) having a low adhesion to the NCC material. After drying, the formed film can be separated (peeled off) from the substrate. The thickness of such a film/sheet may be greater than 10 μm. Thinner sheets may also be obtained. Formation of coatings of NCC materials involves spreading of NCC on a substrate with good adhesion to NCC, followed by drying. The formed coating cannot be separated from the substrate and cannot be a self-standing film. Its thickness may be at least 20 nm.

In some instances, substrates used for barrier coatings are composed or comprise non-polar materials. In such cases, as the substrates may not be compatible with water-based materials, the substrate surface may be surface-treated, prior to forming an NCC-based film thereon, by treating the surface with corona, plasma, etc. After the surface is adjusted to the right surface energy (typically at least 42 Dyne), NCC-based formulation may be applied to yield a desired NCC-based coating or film.

The invention further provides a multilayered structure comprising three or more materials layers, at least one of said three or more materials layer comprises or consists NCC according to the invention.

In other words, the invention concerns a multilayer or stacked structure comprising a substrate or a top-most or bottom-most layer and one or more coats, layers or films of a at least one material, such that at least one of the coats, layers or films comprises or consists at least one NCC material of the invention.

The at least one layer, coat or film of the NCC material may be in direct contact with a substrate or with any one layer, coat or film positioned on the substrate.

The thickness of any of the layers in a multilayered structure may be between 5 and 1,000 nm, between 5 and 100 nm, between 5 and 50 nm, between 5 and 30 nm, between 5 and 20 nm, between 50 and 900 nm, between 100 and 700 nm, or between 200 and 500 nm.

The number (e.g., 2, 3, 4, 5, 6, 7, 8, 9, 10 or more) and constitution of any one or more films or layers in a multi-layered structure may vary and is not limited in any way to any one material composition, mechanical property, physical property, chemical property or any other property, provided that the selection of materials is such that the multi-layered structure meets the required properties.

In some embodiments, the multilayer structure is composed of at least one NCC layers, the thickness of the layer being between about 5 and 20 nm.

In some embodiments, the multilayer comprises a substrate, one layer of NCC material and at least one top layer of a different material. In some embodiments, the at least one top layer of a different material is disposed at the top surface of the NCC material layer, thereby forming a laminate or sandwich multilayer.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3A hydrophilic NCC; FIG. 3B hydrophobic NCC from ethanol; and FIG. 3C hydrophobic NCC from methylene chloride.

FIG. 4A hydrophilic NCC; FIG. 4B hydrophobic NCC from ethanol; and FIG. 4C hydrophobic NCC from methylene chloride.

FIG. 5A hydrophilic NCC; FIG. 5B hydrophobic NCC from ethanol; and FIG. 5C hydrophobic NCC from methylene chloride.

DETAILED DESCRIPTION OF EMBODIMENTS

Figure 1:
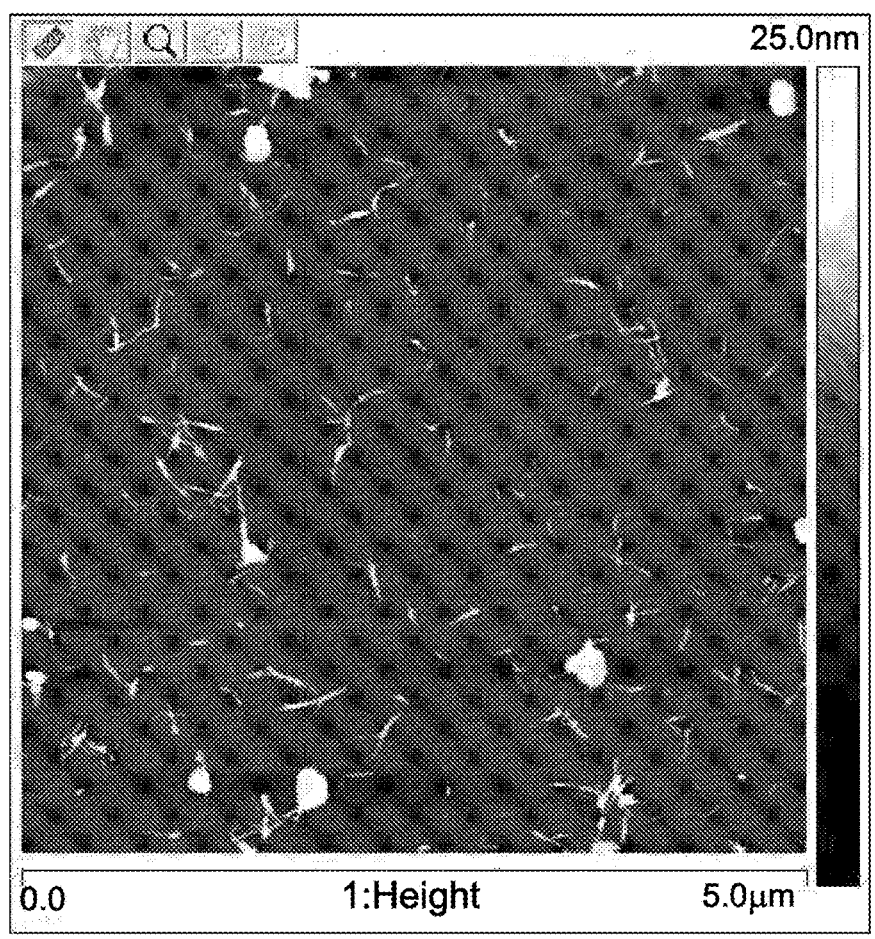
FIG. 1 is an AFM image of NCC acetate in ethanol at 0.0001% concentration. NCC crystals are observed, implying that the NCC crystals were not destroyed.
Figure 2:
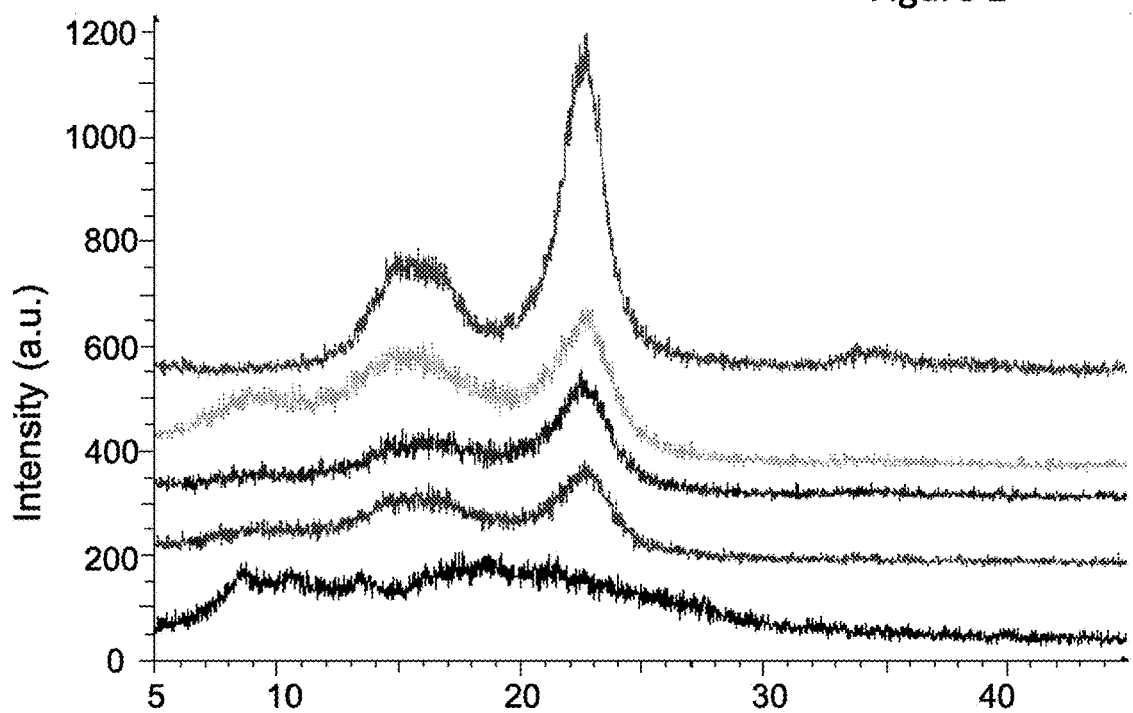
FIG. 2 XRD of NCC acetate films. Results are summarized in Table 3.

Example 1: Preparation of NCC Acetate from Acetic Acid and Acetic Anhydride 3 g of dry NCC were mixed with 30 mL of acetic acid at 80° C. When a white liquid suspension was obtained, 3 mL of acetic anhydride were added. One drop of concentrated sulfuric acid was added (about 30 mg). This corresponds to 1% sulfuric acid compared to the dry weight of the NCC. The mixture was stirred at 80° C. until a completely transparent viscous suspension was obtained (about 1 h). The reaction was cooled and the residual acetic anhydride was quenched by the addition of 3 mL ethanol.

Example 2: Preparation of NCC Acetate from Acetic Acid and Acetic Anhydride 5 g of dry NCC were mixed with 100 ml of acetic acid at 80° C. When a homogenous, white suspension was obtained, 5 mL of acetic anhydride was added. About 50 mg of sulfuric acid was added. This corresponds to 1% of sulfuric acid compared to the dry weight of the NCC. The mixture was stirred at 80° C. until a completely transparent viscous suspension was obtained (about 1 h). The reaction was cooled and the residual acetic anhydride was quenched by the addition of 3 mL ethanol. Using more acetic acid (lower NCC concentration) during the reaction allows better stirring and better homogeneity of suspension, thus leading to a more controlled reaction with a more uniform product.

Example 3: Preparation of NCC Ester from Hexanoic Acid and Acetic Anhydride

NCC (5.5 gr dry) was suspended in hexanoic acid in ratio of 1:20 at 85° C. When a white liquid suspension was obtained, 11 gr of acetic anhydride was added. Sulfuric acid was present, as catalyst, in an amount of 0.1% compared to the dry weight of NCC. The mixture was stirred at 85° C. until a completely transparent viscous suspension was obtained (about 5 min). The reaction was cooled and the residual acetic anhydride was quenched by the addition of 35 mL ethanol.

Example 4: Preparation of NCC Ester from Hexanoic Acid and Acetic Anhydride

NCC (5 gr dry) was suspended in hexanoic acid in ratio of 1:18 at 85° C. When a white liquid suspension was obtained, 10 gr of acetic anhydride was added. Sulfuric acid was present, as catalyst, in an amount of 0.09% compared to the dry weight of NCC. The mixture was stirred at 85° C. until a completely transparent viscous suspension was obtained (about 5 min). The reaction was cooled and the residual acetic anhydride was quenched by the addition of 30 mL ethanol.

Example 5: Preparation of NCC Ester from Hexanoic Acid, Acetic Acid and Acetic Anhydride NCC (6 gr dry) was suspended in hexanoic acid in ratio of 1:20 at 85° C. When a white liquid suspension was obtained, 12 gr of acetic and hexanoic anhydride mixture (1:1) was added. Sulfuric acid was present, as catalyst, in an amount of 0.1% compared to the dry weight of NCC. The mixture was stirred at 85° C. until a completely transparent viscous suspension was obtained (about 5 min). The reaction was cooled and the residual acetic anhydride was quenched by the addition of 35 mL ethanol.

Example 6: Preparation of NCC Methacrylate 5 g of dry NCC were mixed with 100 mL of acetic acid at 80° C. When a homogeneous, white liquid suspension was obtained, 50 mg of Butylated hydroxytoluene (BHT) was added (1% compared to NCC dry weight). 5 mL of methacrylic anhydride was added. About 50 mg of sulfuric acid was added. This corresponds to 1% of sulfuric acid compared to the dry weight of the NCC. The mixture was stirred at 80° C. until a more transparent, slightly yellow, viscous suspension was obtained (about 1 h). The reaction was cooled and the residual acetic anhydride was quenched by the addition of 3 mL ethanol.

Example 7: Preparation of Dialdehyde-NCC Foam 5 g of NCC in water were mixed with 5 gr of sodium periodate and stirred for 3 hours at 40° C., following by addition of 2 ml ethylene glycol. The suspension was dialyzed for 1 day against water. 1 g of the product (DA-NCC) in water was mixed with 0.01 gr of adipic acid dihydrazide to initiate crosslinking of the particles. The suspension was kept at room temperature for 10 minutes, followed by freezing, solvent exchange to ethanol and drying. This resulted in crosslinked NCC foam.

Example 8: Isolation and Purification, Different Procedures

Option 1: The acetic acid in the reaction mixture was partially removed by evaporation during heating and under reduced pressure. Complete drying resulted in undispersable samples. Partial drying gave gels that were further dispersed in either ethanol or acetone with the use of sonication.

Option 2: The acetic acid was removed by the addition of a co solvent e.g. toluene and the remaining acetic acid was removed by co-evaporation.

Option 3: The NCC in the reaction mixture was precipitated in water and the pellet was collected by centrifugation. To the pellet either ethanol or acetone was added followed by sonication to obtain dispersed NCC.

Option 4: The NCC in the reaction mixture was precipitated in ice cold ethyl acetate or in a more hydrophobic solvent. The precipitate was collected by filtration or decantation. Acetone or ethanol was added to the filtrate and after sonication a clear suspensions were obtained in 1-3% concentration. The ethyl acetate in the supernatant could be recovered from the acetic acid and the acetic acid reused.

Option 5: The NCC in the reaction mixture was precipitated in cold ethanol and the pellet was collected by centrifugation. After further washes, to remove residual acetic acid, acetone was added followed by sonication to obtain dispersed NCC.

Example 9: NCC-Acetate Films

The NCC in Ethanol or Acetone were Dispersed and Transferred to Petri Dishes and solvent casting. The films showed birefringence under polarized light and they were hydrophobic and not dispersed in either water or organic solvents. See FIGS. 1-6 and Table 3 and 4.

Figure 3A:
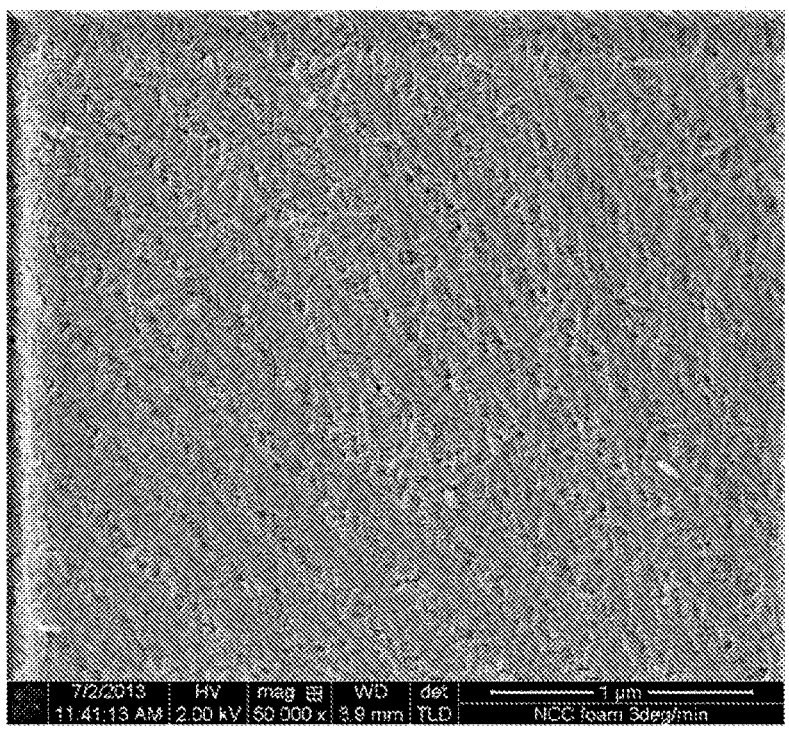
FIGS. 3A-C are SEM images of film surfaces after solvent casting.
Figure 3B:
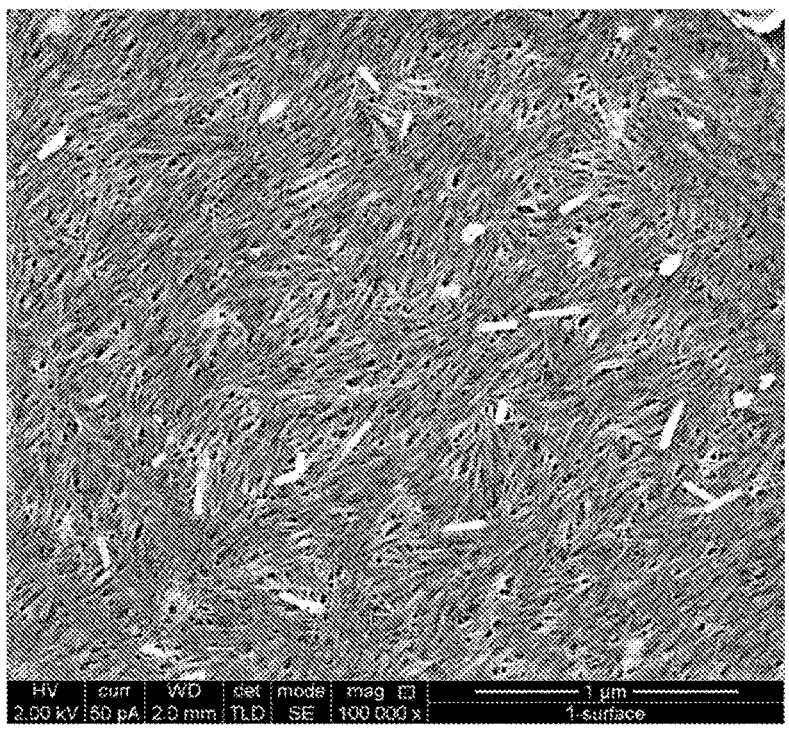
Figure 3C:
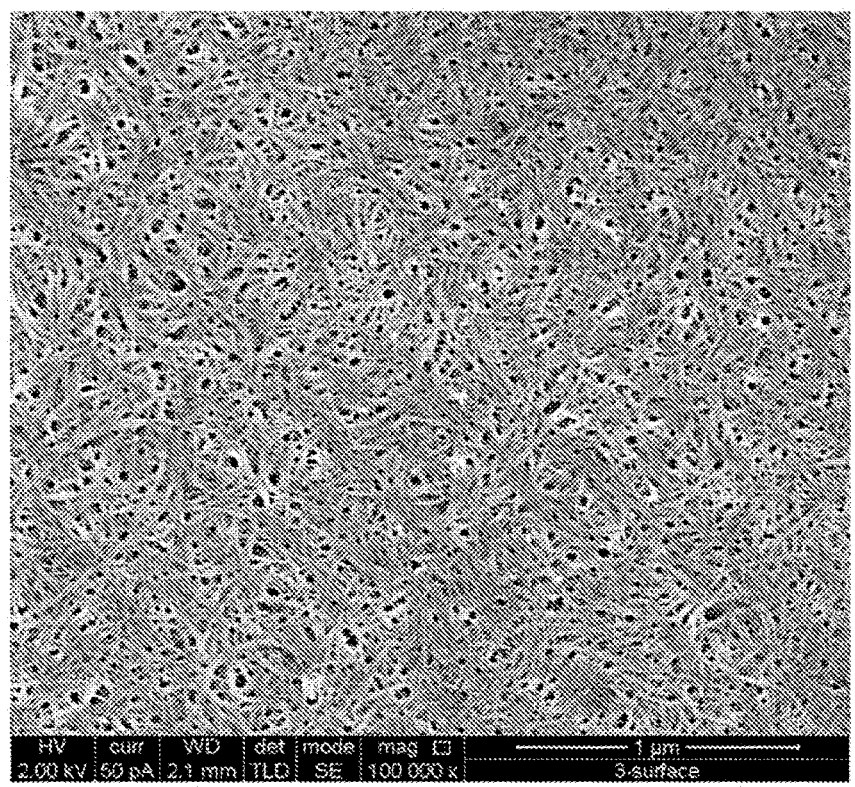
Figure 4A:
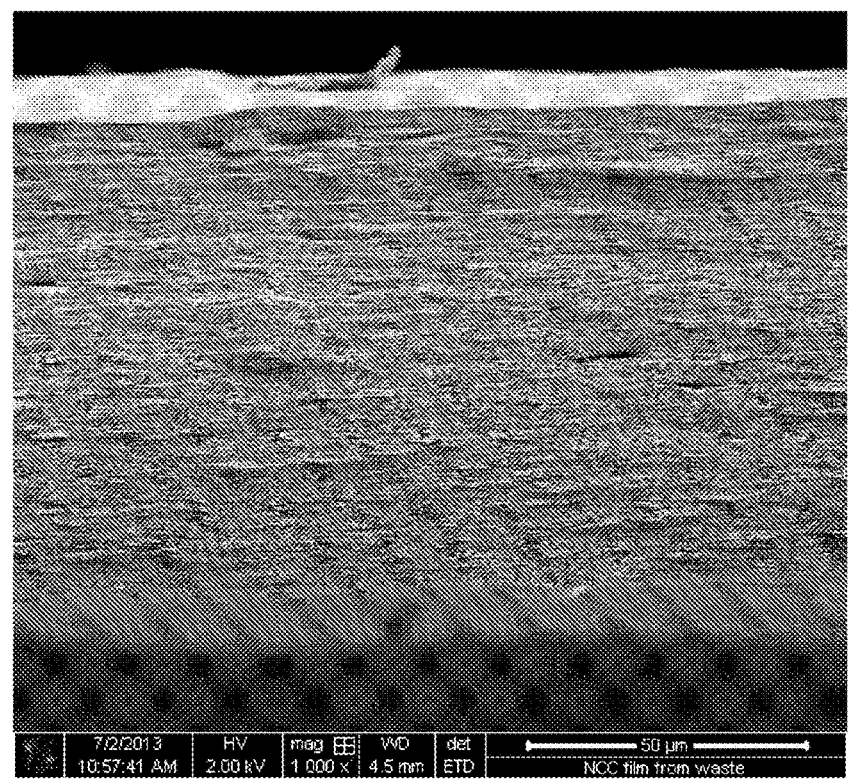
FIGS. 4A-C are SEM images of cross sections of solvent casted films.
Figure 4B:
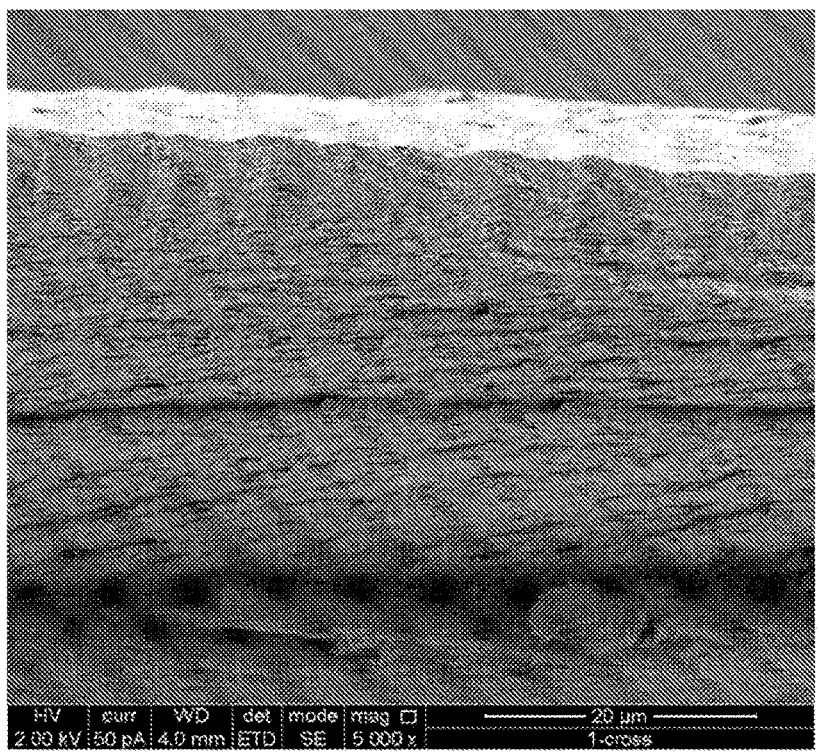
Figure 4C:
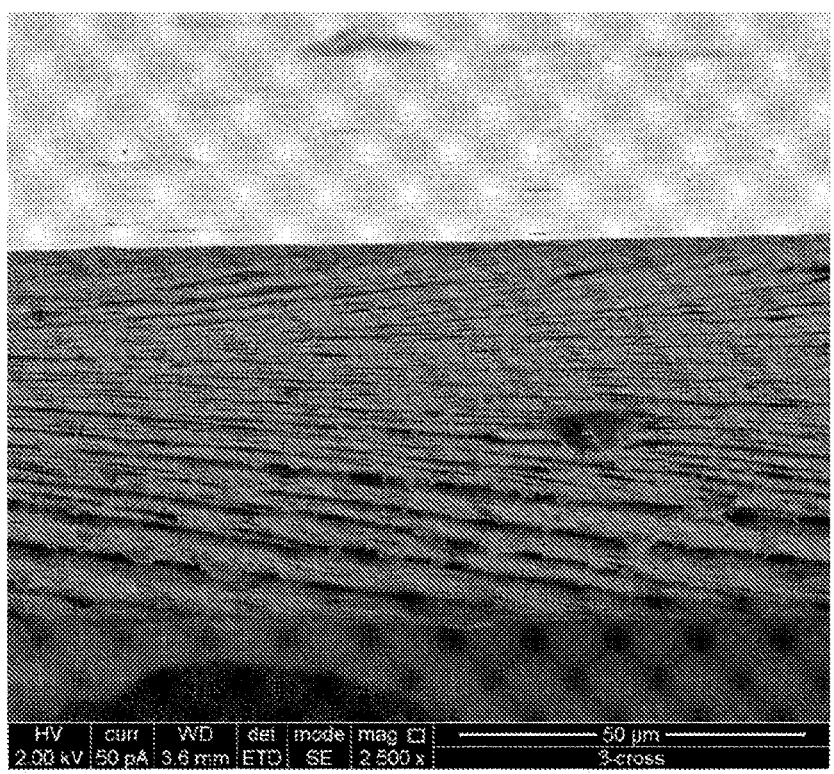
Figure 5A:
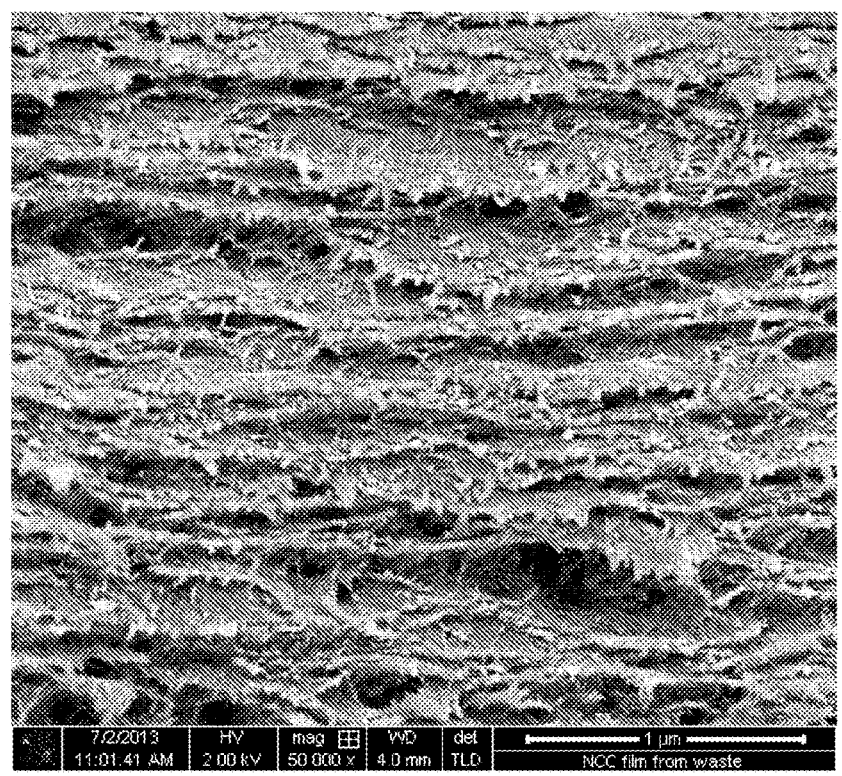
FIGS. 5A-C are SEM images of cross sections of solvent casted films.
Figure 5B:
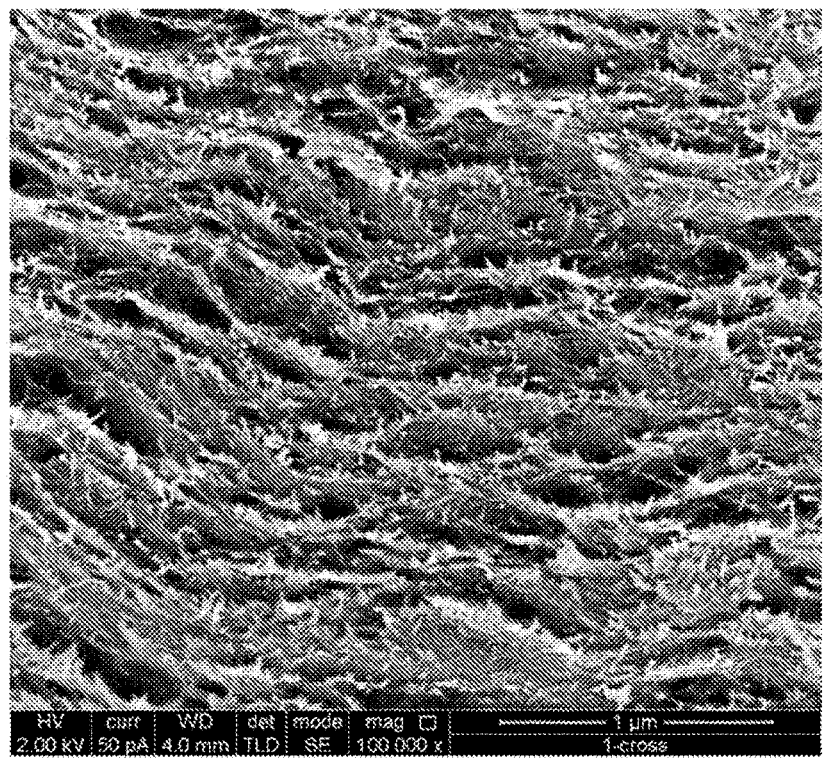
Figure 5C:
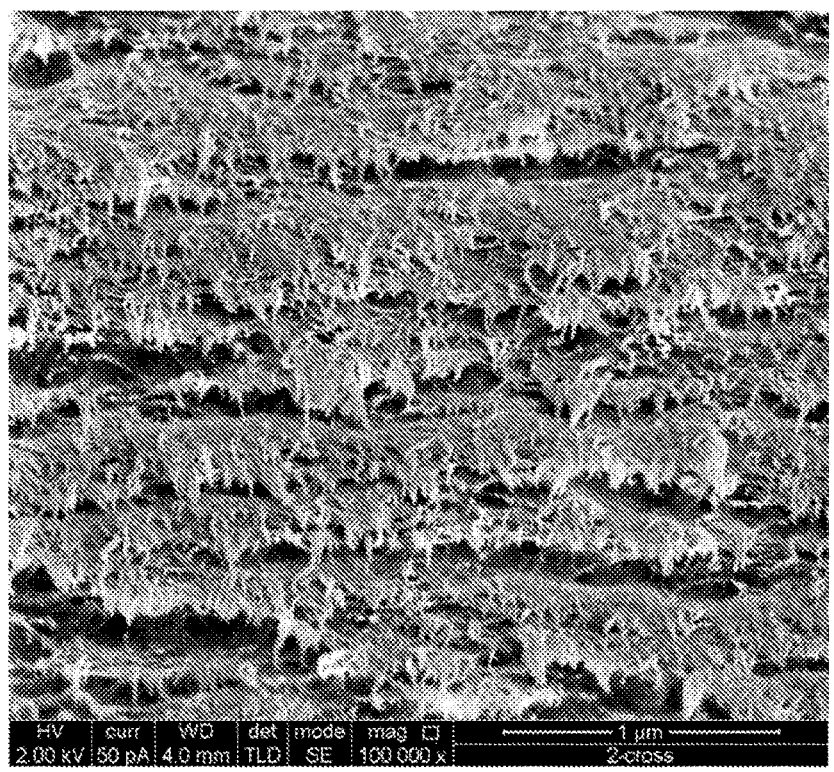
Figure 6:
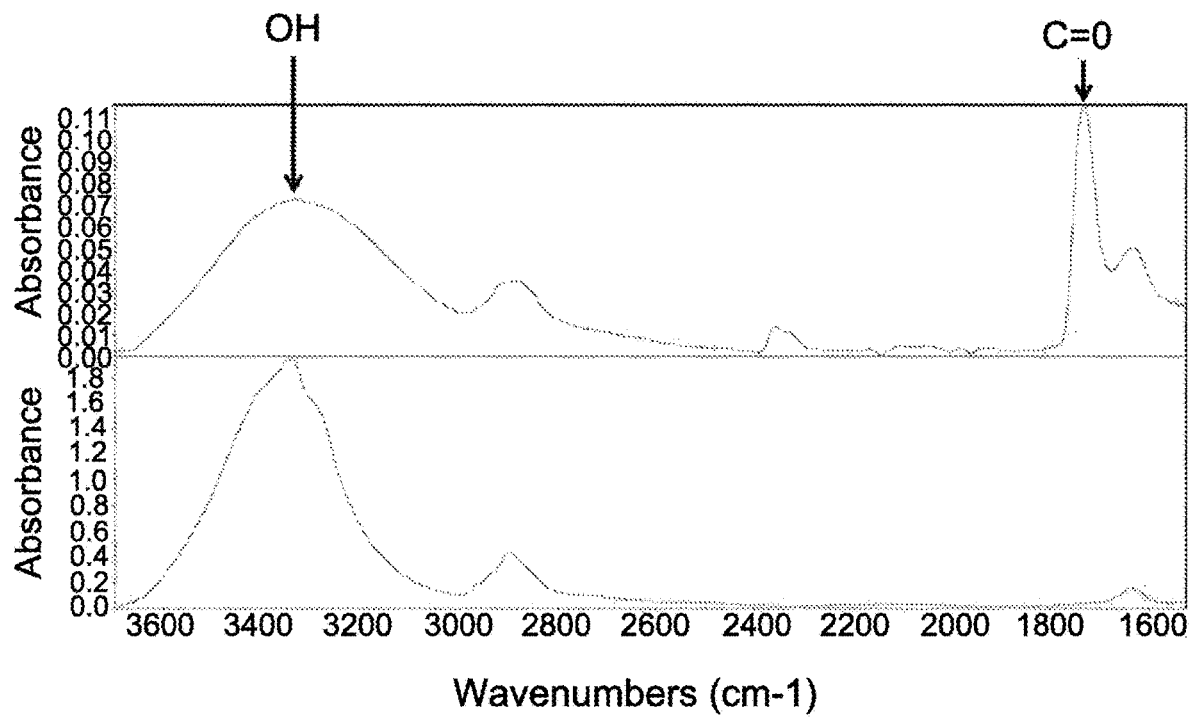
FIG. 6 provides FTIR analysis of NCC acetate as compared to NCC. The peak at 1734 $cm^{-1}$ represents the carbonyl group of the ester bond. The peak at 3336 $cm^{-1}$ represents the hydroxyl groups and is reduced after the acetylation reaction.

As shown, NCC acetate self-assembled into films similarly to unmodified NCC (FIGS. 3-5). The nanostructure of the formed films, as observed using SEM was similar to the unmodified NCC formed films. Using XRD (FIG. 2) it was shown that there was some reduction in crystallinity in NCC acetate, as compared to hydrophilic NCC, but the crystal structure of the particles remained intact.

FTIR analysis (FIG. 6) for the films also showed clear evidence of the chemical modification, with the appearance of a peak at 1723 cm$^{-1}$, attributed to the carbonyl group of the ester bond, while the peak at 3336 cm$^{-1}$ was slightly reduced, indicating that some of the hydroxyl groups have been modified to acetyl groups, but the majority of hydroxyl groups in the crystal, remained. As shown in Table 4, the contact angle of NCC acetate was doubled, from ~30° for films of unmodified NCC to ~60° for films of NCC acetate, implying that the acetylation reduced the hydrophilicity of the material.

TABLE 3

Degree of crystallinity of various NCC acetates

| Sample Name | Degree of crystallinity, % |
|---|---|
| Unmodified NCC | 65.3 |
| NCC acetate in ethanol | 45.5 |
| NCC acetate in methylene chloride 1 | 48.2 |
| NCC acetate in methylene chloride 2 | 45.2 |
| NCC acetate in acetone | 50.6% |

TABLE 4

Contact angle measurements of hydrophobic NCC on glass

| Layer | | Contact angle (degree °) |
|---|---|---|
| 1 | 3% NCC acetate | 62.34 |
| 2 | 1% NCC acetate | 61.1 |
| 3 | 1% NCC | 31.87 |
| 4 | 1% NCC + 0.1% SPAN | 55.35 |

Example 10: Foams Made from Cellulose Pulp and Xyloglucan 20 g TKP (tamarind kernel powder) was dissolved in 1 L water at 70-80° C. during strong mixing. After a solution is obtained the mixture is cooled and 50 g pulp is added and the mixture is allowed to stand for 2-3 hours to wet the pulp. The mixture is then subjected to strong mechanical stirring with a kitchen aid for 2 hour to ensure a homogenic high viscosity gel like mixture of the pulp. 5 mL of a commercial detergent in 50% water is added and the mixture is foamed to a certain volume during mixing. The foam is dried at 120° C. overnight.

Example 11: Cleaning TKP (to >70% Xyloglucan Content)

20 g TKP (tamarind kernel powder) is dissolved in 1 L water at 70-80° C. during strong mechanical mixing. When all the xyloglucan is dissolved the mixture is cooled to room temperature. The solid impurities (denaturated proteins, fibers and ash) are removed by centrifugation at 5000 RPM for 10 min and the supernatant containing the xyloglucan is collected (at this point the material is semi-clean, 45%-70% Xg content). 2 L of ethanol are added to the solution, leading to the sedimentation of the Xg. The pellet is washed with ethanol and is then dried.

Example 12: Foams Made from Cellulose Pulp and Xyloglucan 20 g TKP (tamarind kernel powder) was dissolved in 1 L water at 70-80° C. during strong mixing. After a solution is obtained the mixture is cooled and 50 g pulp is added and the mixture is allowed to stand for 2-3 hours to wet the pulp. The mixture is then subjected to strong mechanical stirring for 2 hour to ensure a homogenic high viscosity gel like mixture of the pulp. 5 mL of a commercial detergent in 50% water is added and the mixture is foamed to a certain volume. The foam is then applied to a container and frozen at −20° C. The freezing can be unidirectional or from two directions. The frozen foam is thawed for 4-5 hours in 3 L ethanol to precipitate the xyloglucan and to remove the water. After thawing the ethanol is replaced with 3 L fresh ethanol and the foam is agitated overnight to remove the remaining water. The ethanol was removed and the foam was dried at 110° C. for 5 hours with applying slight pressure on the foam to ensure an even drying and straight foam panels.

Example 13: Foams Made from Cellulose Pulp, NCC and Xyloglucan 20 g TKP (tamarind kernel powder) is dissolved in 1 L water at 70-80° C. during strong mechanical mixing. When all the xyloglucan is dissolved the mixture is cooled to room temperature. The solid impurities (denaturated proteins, lipids and ash) are removed by centrifugation at 5000 RPM for 10 min and the supernatant containing the xyloglucan is collected.

50 g pulp is added to the purified xyloglucan and the mixture is allowed to stand for 2-3 hours to wet the pulp. The mixture is then subjected to strong mechanical stirring with a kitchen aid for 1-3 hour to ensure a homogenic high viscosity gel like mixture of the pulp.

167 ml of a 3% NCC suspension is added (5 g dry weight) to the xyloglucan pulp mixture during stirring.

2 ml of a 50% commercial detergent in water is added and the mixture is foamed to a certain volume. The foam is then applied to a container and frozen at −20° C. The freezing can be unidirectional or from two directions. The frozen foam is thawed for 4-5 hours in 3 L ethanol to precipitate the xyloglucan and to remove the water. After thawing the ethanol is replaced with 3 L fresh ethanol and the foam is agitated overnight to remove the remaining water. The ethanol was removed and the foam was dried at 110° C. for 5 hours with applying slight pressure on the foam to ensure an even drying and straight foam panels.

Example 14: Crosslinked Foams Made from Oxidized Cellulose Pulp, NCC and Xyloglucan 20 g TKP (tamarind kernel powder) is dissolved in 1 L water at 70-80° C. during strong mechanical mixing. When all the xyloglucan is dissolved the mixture is cooled to room temperature. The solid impurities (denaturated proteins, lipids and ash) are removed by centrifugation at 5000 RPM for 10 min and the supernatant containing the xyloglucan is collected.

50 g pulp is added to the purified xyloglucan and the mixture is allowed to stand for 2-3 hours to wet the pulp. The mixture is then subjected to strong mechanical stirring with a kitchen aid for 1-3 hour to ensure a homogenic high viscosity gel like mixture of the pulp.

167 ml of a 3% NCC suspension is added (5 g dry weight) to the xyloglucan pulp mixture during stirring.

20 gr sodium periodate is added to the mixture. Stirring continues for 2 hours. 5 ml of ethylene glycol is added to the mixture. 2 gr of adipic acid dihydrazide are added to the mixture and stirring continues for 15 more minutes.

2 ml of a 50% commercial detergent in water is added and the mixture is foamed to a certain volume. The foam is then applied to a container and frozen at −20° C. The freezing can be unidirectional or from two directions. The frozen foam is thawed for 4-5 hours in 3 L ethanol to precipitate the xyloglucan and to remove the water. After thawing the ethanol is replaced with 3 L fresh ethanol and the foam is agitated overnight to remove the remaining water. The ethanol was removed and the foam was dried at 110° C. for 5 hours with applying slight pressure on the foam to ensure an even drying and straight foam panels.

Example 15: Films of NCC and Xyloglucan

Some of the substrates used for barrier coatings are non-polar and therefor are not compatibles with water based materials. For non-polar substrates like petroleum based aliphatic polymers, surface treatment is required (corona, plasma, etc.) After the surface was adjusted to the right surface energy (typically at least 42 Dyne) NCC coating is applied.

2% NCC dispersion in water at pH of 5.0 was mixed with 8% XG (or other filler). A4 size 30 μm thicknesses BOPP film was laid on a K202 control coater (RK Printcoat Instruments). A meter bar applicator of 4-500 μm wet film deposition, preferably 50-100 μm wet film deposition was mounted on the control coater and tightened. Using a pipette, a line of 5 ml of the mixture was applied on the upper part of the BOPP film, closest to the meter bar, without touching it. The machine was activated on forward mode, at a speed level of 3. The film was left to dry for one hour at room temperature and humidity.

Figure 7:
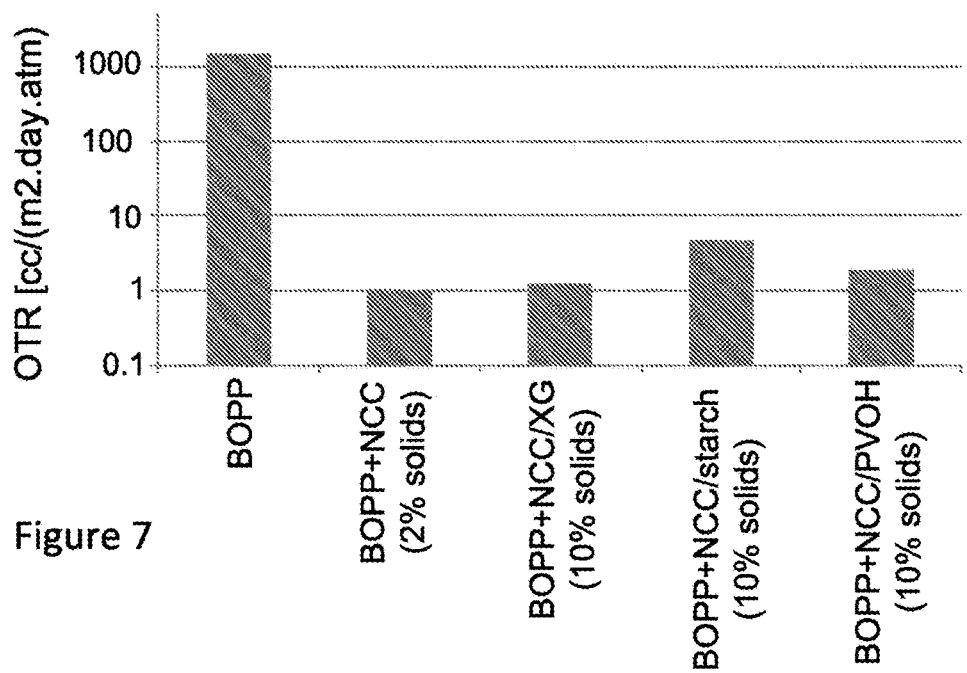
FIG. 7 presents OTR measurements.

As shown in the FIG. 7, application of NCC reduced OTR of BOPP from 1500 to 1 (cc/$m^2$·day·atm). It can be seen that the OTR of a BOPP film by itself was ~1500 cc/$m^2$·day·atm. After coating the BOPP with NCC, the OTR was reduced significantly to 1 cc/$m^2$·day·atm. Addition of xyloglucan, starch and PVOH to the NCC suspension (2% NCC+8% additive) led to an increase in the solid content of the suspension (10%) and resulted in OTR values similar to those of NCC coating alone.

Without wishing to be bound by theory, after acetylation, NCC particles are modified to NCC acetate particles. Some of the hydroxyl groups on the surface of the particles are modified to acetyl groups. This modification leads to the ability to disperse the NCC acetate in organic solvents such as ethanol, acetone, DCM, MEK, unlike unmodified NCC. In addition, NCC acetate can be mixed inside non-hydrophilic polymer solutions or in organic solvents with non-hydrophilic polymers (e.g. mixed with cellulose acetate inside acetone). Moreover, NCC acetate in organic solvents maintains the characteristics of unmodified NCC in water, such as birefringence, self-assembly into transparent films, ability to coat surfaces and show oxygen barrier capabilities. While the modification process changes the surface of the crystals only slightly, the advantages associated with the modification are clearly numerous and of great importance in the construction of films, foams and other solid structures.

The invention claimed is:

1. A process for manufacturing nanocrystalline cellulose (NCC) ester, the process comprising treating NCC with compounds consisting of at least one anhydride, at least one carboxylic acid, and sulfuric acid, at a temperature between 40 and 110° C., wherein the amount of the sulfuric acid is between 0.01% and 1%, compared to the weight of NCC and wherein the ratio of the at least one carboxylic acid to NCC is between 5-20 to 1 and the ratio of each of the at least one anhydride to NCC is between 0.5-2 to 1.

2. A process according to claim 1, wherein the temperature is between 50 and 110° C.

3. The process according to claim 1, wherein the at least one acid is sulfuric acid and the amount thereof is between 0.5% and 1%.

4. The process according to claim 1, wherein the temperature is between 50 and 100° C.

5. The process according to claim 1, wherein the at least one anhydride is selected from acetic anhydride, propionic anhydride, butanoic anhydride, pentanoic anhydride, hexanoic anhydride, heptanoic anhydride, octanoic anhydride, maleic anhydride, and substituted forms thereof.

6. The process according to claim 1, wherein the at least one carboxylic acid is the at least one anhydride is selected from acetic acid, propionic acid, butanoic acid, pentanoic acid, hexanoic acid, heptanoic acid, octanoic acid, acrylic acid, methacrylic acid, pyruvic acid, isobutyric acid, crotonic acid, vinylacetic acid, tetrolic acid, ketobutyric acid, acetoacetic acid, pivalic acid, furoic acid, benzoic acid, sorbic acid, phthalic acid, capric acid and substituted forms thereof.

7. The process according to claim 5, wherein the at least one anhydride is acetic anhydride.

8. The process according to claim 6, wherein the at least one carboxylic acid is acetic acid or hexanoic acid.

9. The process according to claim 1, the process comprising treating NCC with acetic acid and acetic anhydride and optionally hexanoic acid.

10. The process according to claim 1 for producing NCC acetate, NCC hexanoate, NCC methacrylate and mixtures thereof.

11. The process according to claim 1, wherein the temperature is between 50 and 70° C.

12. The process according to claim 1, wherein the temperature is between 60 and 110° C.

13. The process according to claim 1, wherein the temperature is between 60 and 100° C.

14. The process according to claim 1, wherein the temperature is between 60 and 70° C.

15. The process according to claim 1, wherein the temperature is between 70 and 110° C.

16. The process according to claim 1, wherein the temperature is between 70 and 100° C.

17. The process according to claim 1, wherein the temperature is between 70 and 80° C.

18. The process according to claim 1, wherein the temperature is between 80 and 110° C.

19. The process according to claim 1, wherein the temperature is between 80 and 100° C.

20. The process according to claim 1, wherein the temperature is between 80 and 90° C.

* * * * *